Jan. 3, 1967 E. P. MOSLO 3,295,169
SPRING-PRESSED SHUTOFF FOR INJECTION NOZZLE
Filed Dec. 23, 1963

INVENTOR.
ERNEST P. MOSLO
BY
Meyer, Baldwin, Doran & Egan
ATTORNEYS

The United States Patent Office 3,295,169
Patented Jan. 3, 1967

3,295,169
SPRING-PRESSED SHUTOFF FOR INJECTION NOZZLE
Ernest P. Moslo, 3443 Prospect Ave., Cleveland, Ohio 44115
Filed Dec. 23, 1963, Ser. No. 332,654
6 Claims. (Cl. 18—30)

This invention relates to an improvement in a spring pressed shutoff for an injection nozzle for use in connection with a plastic injection molding machine.

One of the objects of the present invention is to provide such a shutoff nozzle normally urged toward closed position but automatically moved toward open position upon application of injection pressure to material passing through the nozzle because of differential pressure areas embodied in the nozzle design.

Another object of the present invention is to provide an injection nozzle of this improved type involving a small number of easily constructed parts and adapted to operate over long periods of time without difficulty.

Other objects and advantages of the invention will be apparent from the accompanying drawings and description and the essential features thereof will be set forth in the appended claims.

In the drawings:

FIG. 3 is an end elevation of the same taken from the right-hand end of FIG. 1; while

Figure 1:
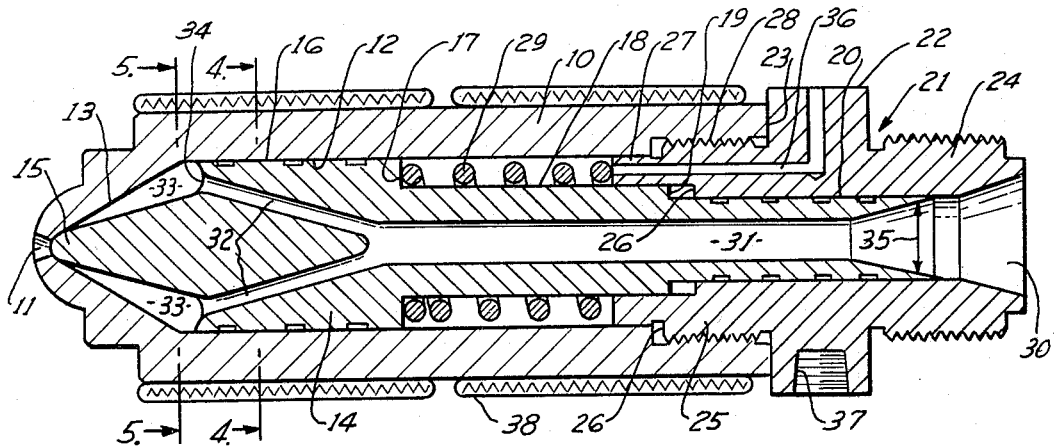
FIG. 1 is a central sectional view through the improved nozzle of this invention.
Figure 2:
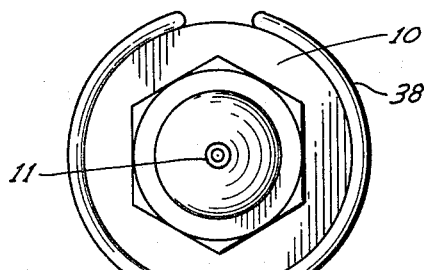
FIG. 2 is an end elevation of the same taken from the left-hand end of FIG. 1.
Figure 3:
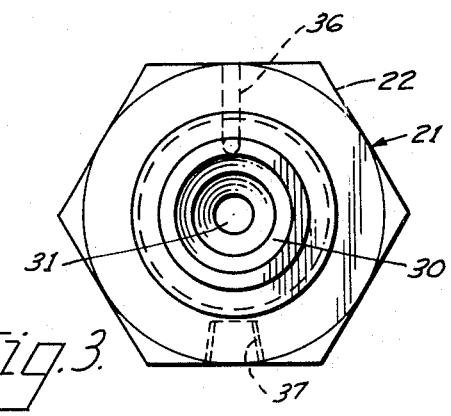

The improved nozzle of this invention comprises a novel body 10 which is open at the rear end but closed at the forward end except for a small discharge opening 11. This body has a generally cylindrical internal diameter 12 for the major portion of its length except at the forward end where it tapers in generally conical shape as indicated at 13 toward the discharge opening 11.

A shutoff pin 14 is slidably mounted in the hollow body 10. This pin has a nose 15 adapted to close this discharge opening 11. Rearwardly thereof there is first a pin zone 16 of large diameter snugly fitting the internal diameter 12 of the body. This is connected by a first radial shoulder 17 with a pin zone of intermediate diameter 18. This in turn is connected by a second radial shoulder 19 with a pin zone of smaller diameter. It will be noted that this smaller diameter portion of the pin 14 extends rearwardly beyond the rear end of the nozzle body 10.

An end member 21 has a portion 22 of diameter large enough to abut and close the open rear end of the body 10 as indicated at 23. A portion 24 extending rearwardly from the portion 22 is adapted to be connected to an injection molding machine for forcing material through the nozzle during a molding operation. As here shown it is provided with threads for this purpose. Forwardly of the portion 22 the end member has a portion 25 whose inside diameter snugly fits the smaller diameter zone 20 of the pin. This is connected by a radial shoulder 26 with a ring 27 which fits annularly between the intermediate diameter of the pin and the interal diameter 12 of the nozzle body. The end member has a threaded connection at 28 with the nozzle body.

Means is provided urging the pin toward its closed position. In the present embodiment, this comprises a helical spring 29 surrounding the intermediate diameter zone portion of the pin. When the end member abuts against the nozzle body 10 at 23, then the spring 29 is compressed between the ring 27 and the radial shoulder 17 of the pin. At the same time, the shoulder 26 of the end member is positioned axially from the shoulder 19 of the pin so as to allow the pin to slide rearwardly to open the discharge opening 11.

Figure 4:
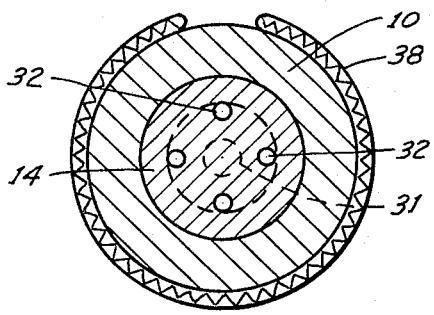
FIGS. 4 and 5 are sectional views taken along similarly numbered lines of FIG. 1.
Figure 5:
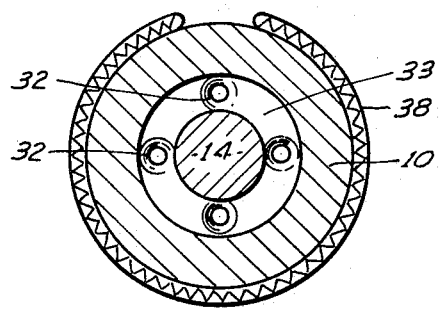

A central passageway 30 through the end member communicates with a central passageway 31 through a major portion of the length of the pin 14. This passageway 31 is smaller in diameter than the pin diameter 20. Just ahead of the shoulder 17 on the pin the central passageway communicates with a plurality of diverging passageways 32 which are evenly spaced about the central axis of the pin 14 as clearly seen in FIGS. 4 and 5. This is so the pressure in these passageways will balance each other in a radial direction so that the pin slides easily in the body 10. At their forward ends, these passageways 32 communicate with an annular pocket 33 which surrounds the nose 15 and this pocket will communicate with the discharge opening 11 when the pin moves backwardly to cause the shoulders 19 and 26 to come together as stop members.

The cross sectional area of the pocket 33 where it faces rearwardly at 34 is greater than the cross sectional area at 35 at the rear end of the pin exposed to the pressure of injection material exerted forwardly.

The operation of the above injection nozzle from the above description should now be apparent. With no pressure of injection material, the parts will lie in the position of FIG. 1 with the nose 15 of the pin 14 closing the discharge opening 11 in the nozzle body 10. This is due to the urging of the helical spring 29. When injection material is forced through the passageways 30, 31 and 32 to the pocket 33 at the start of an injection operation, the pressure will build up at the cross sectional area 34 to overcome the pressure exerted at the cross sectional area 35 and thus cause rearward movement of the pin 14 compressing the helical spring 29 and causing shoulders 19 and 26 to engage. This will open the nozzle at 11 so that the injection material will pass out of the discharge pocket 33 in a molding operation. As soon as the molding operation ceases, then the spring 29 will again press the pin 14 forwardly so that the nose 15 will close the discharge opening 11.

A vent opening 36 is provided through the end member 21 extending through the ring 27 and rearwardly parallel to the axis of the pin 14 to the larger diameter portion 22 of the end member and then outwardly where it communicates with the atmosphere or any other suitable point.

The opening 37 is for the insertion of a thermocouple, is desired.

Usually means is provided for keeping a nozzle of this type heated and the form here shown comprises standard electrically energized heating bands 38.

What is claimed is:

1. An injection nozzle comprising a hollow elongated nozzle body having an open rear inlet end and a forward discharge end closed except for a small discharge opening, a shutoff pin slidably mounted in said body for axial movement and having a large section substantially sealingly engaging the walls of said body at a zone spaced rearwardly from said discharge opening, said pin extending away from said discharge end and beyond said open end of said body and there being cylindrical and spaced radially inwardly and concentric with a cylindrical inner wall surface portion of said body leaving an annular space there, an end member secured to said body at said inlet end and entering said annular space and sealingly engaging said cylindrical pin portion and said cylindrical wall surface portion of said body, said pin being axially movable relative to said end member, means normally urging said pin in position closing said discharge opening, there being a stop portion on said end member disposed rearwardly of said urging means, a stop on said pin disposed rearwardly of said urging means and spaced forwardly from said stop portion when said pin is in said closing position, said end member having an axially extending ring-like portion disposed forwardly of said stop portion and extending forwardly of said stop on said pin in generally encompassing engaged relation with said pin for supporting and guiding said pin for axial movement thereof with respect to said body and said end member, there being a central material passageway through said end member and through said pin from end to end, said passageway terminating in a discharge pocket at said discharge end, said pocket being disposed forwardly of said zone and having a defining surface which tapers smoothly toward said discharge opening and merges with the latter, the front end of said pin comprising a smoothly forwardly tapering nose portion adapted for closing said discharge opening when said pin is in said closing position, said nose portion being disposed in radially inwardly spaced relation to said defining surface of said pocket except at the distal end of said nose portion when said pin is in said closing position, said pocket communicating with said discharge opening when said pin is in open position, and the cross sectional area of said pocket being greater than the cross sectional area of said pin exposed to pressure from said inlet end during injection creating a differential pressure adapted to overcome said urging means and tending toward pin-opening movement, whereby said pin normally closes said discharge opening but, under injection pressure, said differential pressure overcomes said urging means and moves said pin in opening direction until said stop on said pin engages said stop portion on said end member.

2. An injection nozzle as set forth in claim 1 wherein said pin has a zone of reduced outside diameter on the inlet side of said sealing engagement zone providing an annular pocket there, a helical spring in said annular pocket forming said urging means, and said ring-like porton of said end member providing a spring-stop member in the inlet end of said annular pocket and compressing said spring against said large diameter section of said pin nearer said discharge opening, said end member being secured to said body in axially adjustable relation whereby the compression of said spring may be varied depending on the axial position of said end member with respect to said body.

3. An injection nozzle as set forth in claim 1 wherein said central passageway communicates with said discharge pocket by means of a plurality of passageways diverging from the center of said pin forwardly and radially outwardly, said diverging passageways being evenly spaced circumferentially about the axis of said pin and being disposed at approximately the same angle of slope with respect to the axis of said pin as the angle of slope of said nose portion.

4. An injection nozzle comprising a hollow elongated nozzle body adapted for coaction with heating means and being open at the rear end and closed at the forward end except for a small discharge opening, said body having a generally cylindrical internal surface except at said forward end where it tapers smoothly toward said opening and merges with the latter, a shutoff pin slidably mounted in the hollow of said body, said pin having a nose adapted to close said opening and rearwardly thereof in sequence a zone of large diameter snugly fitting the body internal diameter connected by a first radial shoulder with a zone of intermediate diameter in turn connected by a second radial shoulder with a zone of smaller diameter which extends beyond the rear end of said body when said nose closes said opening, an end member having a portion of large diameter adapted to abut and close said open rear end of said body and a first portion extending rearwardly therefrom and having an inside diameter in snug fitting relatively slidable relation to said smaller diameter zone of said pin, and adapted for connection to a source of injection material under pressure, and a second portion extending forwardly therefrom having an inside diameter snugly fitting in relatively slidable relation said smaller diameter zone of said pin and connected by a radial shoulder with a ring having an inside diameter approximately equal to said intermediate diameter of said pin and an outside diameter approximately equal to said internal diameter of said body, said end member threadedly engaging said body for securing said end member to said body, a helical spring surrounding said intermediate diameter zone of said pin, said ring compressing said spring against said first radial shoulder with a slight space between said second radial shoulder of said pin and said radial shoulder of said end member when said larger diameter portion of said end member abuts said body, said ring extending forwardly of said second radial shoulder of said pin and said radial shoulder of said end member and engaging said intermediate diameter zone of said pin in encompassing relation for guiding and supporting said pin during axial movement of the latter with respect to said body and said end member, said second radial shoulder on said pin and said radial shoulder on said end member being disposed rearwardly of said spring, there being a discharge pocket defined by said tapered forward end of said internal surface of said body surrounding said nose and a material passageway through said end member and said pin communicating with said discharge pocket, said nose being of generally conical configuration and being disposed in radially inwardly spaced relation to said tapered forward end of said internal surface of said body except at the distal end of said nose when said pin is in closing position, and the cross sectional area of said pocket being greater than the cross sectional area of said pin exposed to pressure from said inlet end during injection creating a differential pressure adapted to overcome said spring and tending toward pin-opening movement, whereby said pin normally closes said discharge opening but, under injection pressure, said differential pressure overcomes said spring and moves said pin in opening direction until said second radial shoulder on said pin engages said radial shoulder on said end member.

5. An injection nozzle as set forth in claim 4 wherein said passageway extends for a major portion of its length axially of said pin and communicates with said discharge pocket by means of at least four passageways diverging from the center of said pin forwardly and radially outwardly, said diverging passageways being disposed intermediate the forward and rearward extremities of said large diameter zone of said pin and in evenly spaced circumferential relation about the axis of said pin, said diverging passageways being disposed at approximately the same angle of slope with respect to the axis of said pin as the angle of slope of said nose.

6. An injection nozzle as set forth in claim 4 including a vent passageway extending through said end member including said ring and communicating exteriorly of said end member.

References Cited by the Examiner
UNITED STATES PATENTS 2,345,917    4/1944    Coffman _____ 18—30

FOREIGN PATENTS 912,194    4/1946    France.

J. SPENCER OVERHOLSER, *Primary Examiner.*

W. L. McBAY, *Assistant Examiner.*